United States Patent [19]

Lamberts et al.

[11] 4,357,625

[45] Nov. 2, 1982

[54] LIGHT VALVE IMAGING APPARATUS HAVING ENLARGED PIXEL EXPOSING REGIONS

[75] Inventors: Robert L. Lamberts, Penfield; Jerry R. Varner, Fairport, both of N.Y.

[73] Assignee: Eastman Kodak Company, Rochester, N.Y.

[21] Appl. No.: 230,091

[22] Filed: Jan. 29, 1981

[51] Int. Cl.³ .............................................. H04N 1/46
[52] U.S. Cl. ............................................ 358/75; 358/61
[58] Field of Search .................. 358/75, 60, 61, 213, 358/285, 286, 296, 300, 302; 355/4, 5, 18, 32, 37, 38, 67, 70, 71; 350/370, 374, 378, 380, 400; 353/20

[56] References Cited

U.S. PATENT DOCUMENTS

| | | | |
|---|---|---|---|
| 3,428,743 | 2/1969 | Hanlon | 358/61 |
| 3,470,310 | 9/1969 | Shashoua | 358/61 |
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

*Primary Examiner*—Michael A. Masinick
*Attorney, Agent, or Firm*—John D. Husser

[57] ABSTRACT

Electronic imaging apparatus of the kind having light valve arrays operable to selectively pass light to an imaging zone in response to electrical activation according to an image signal features a light valve array having a plurality of pixel exposing regions that are each larger in area than the pixels to be imaged thereby at the imaging zone and means for directing light from respective pixel exposing regions to respective reduced-size pixels of the imaging zone.

14 Claims, 7 Drawing Figures

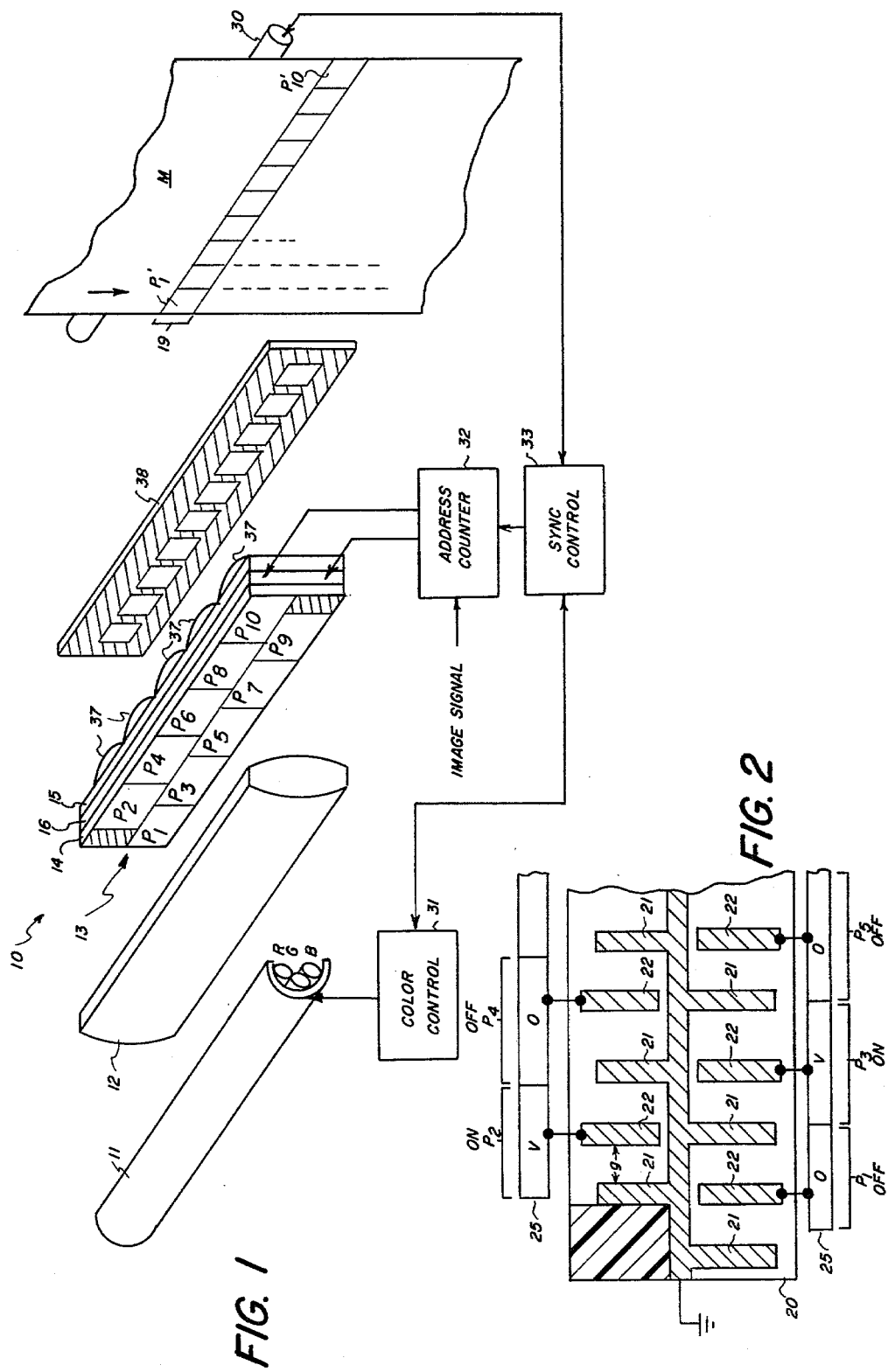

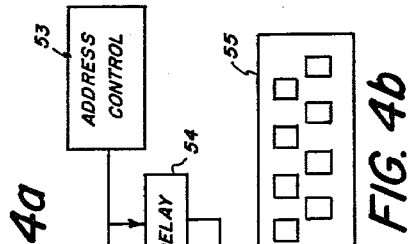
FIG. 4a
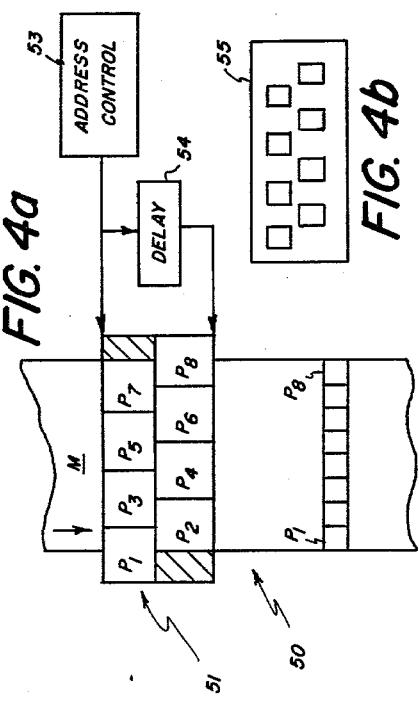
FIG. 4b
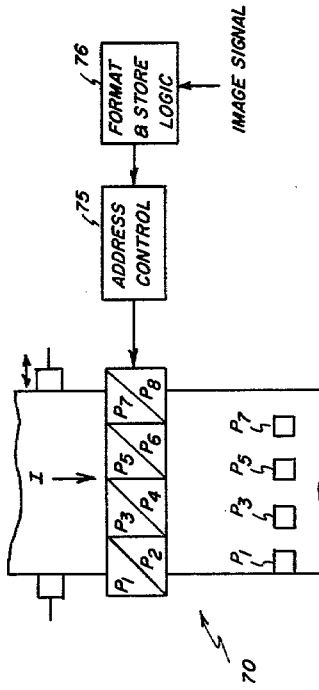
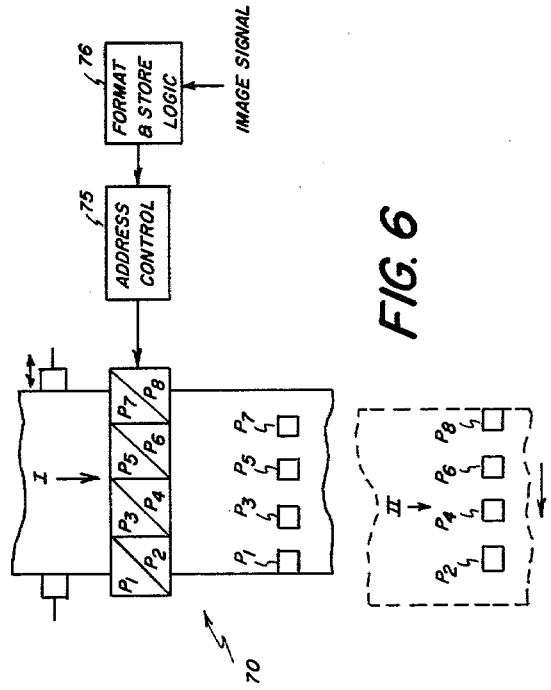
FIG. 6
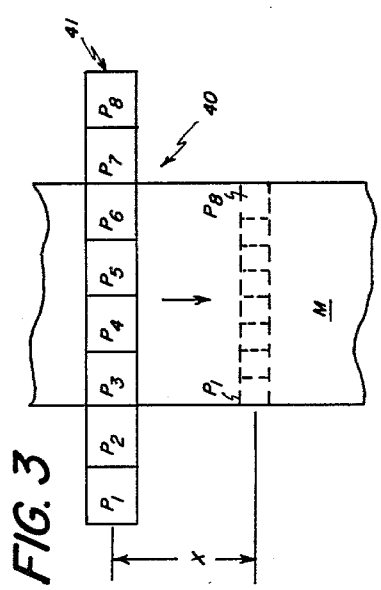
FIG. 3
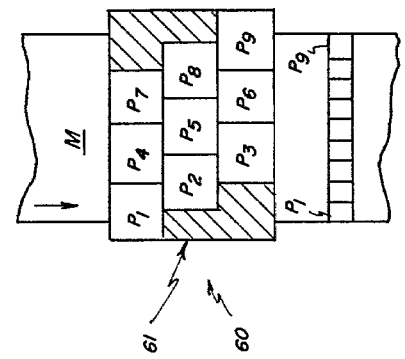
FIG. 5

४,३५७,६२५

LIGHT VALVE IMAGING APPARATUS HAVING ENLARGED PIXEL EXPOSING REGIONS

CROSS-REFERENCE TO RELATED APPLICATIONS

Reference is made herein to U.S. patent application Ser. No. 230,089, entitled "Light Valve Imaging Apparatus Having Improved Optical Configuration", filed Jan. 29, 1981, in the name of J. R. Varner; U.S. patent application Ser. No. 230,096, entitled "Electronic Color Imaging Apparatus Having Improved Color Control Device", filed Jan. 29, 1981, in the name of J. M. Mir; U.S. patent application Ser. No. 230,099, entitled "Light Valve Imaging Apparatus Having Improved Addressing Electrode Structure", filed Jan. 29, 1981, in the names of J. M. Mir and J. R. Varner; U.S. patent application Ser. No. 230,095, entitled "Light Valve Imaging with Optimized Addressing Potential(s) to Reduce Inter-Pixel Nonuniformity", filed Jan. 29, 1981, in the name of J. M. Mir and U.S. patent application Ser. No. 230,092, entitled "Improved Light Valve Imaging Apparatus and Method for Providing Gray Scale", filed Jan. 29, 1981, in the name of J. M. Mir.

BACKGROUND OF THE INVENTION

1. Field of the Invention

The present invention relates to apparatus for forming an image (on a recording medium or for viewing) from an electrical signal and more particularly to improvements in electronic imaging apparatus of the kind using an array of individually addressable light valves.

2. Brief Description of the Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with the energization of red, green and blue exposing sources and according to the red, green and blue color information for the pixels of that image.

The pixel exposing regions of the light valve arrays disclosed in U.S. Pat. No. 4,229,095 are generally of the same size as the pixels to be recorded on the photosensitive medium and lens means are provided for imaging the array at an exposure station past which the recording medium is moved.

In certain applications, e.g. where it is desired to produce high quality continuous tone images such as photographic prints, a detractive artifact has been noted in imaging with light valve arrays of the kind described above. Specifically, in continuous tone areas a visible density difference is sometimes evident between adjacent pixel regions which have been exposed by light valves that received substantially identical electrical energizations. These density differences appear as particularly detractive streaks or bands when exposure is made with relative movement between the imaging media and linear light valve arrays.

SUMMARY OF THE INVENTION

In one significant aspect, it is a purpose of the present invention to provide means and method for reducinfg the distractive artifacts such streaking and banding described above and thus provide improved electronic, light-valve, imaging.

The above advantages are achieved in accordance with one preferred embodiment of the present invention by providing in electronic light valve imaging apparatus an improved construction comprising pixel exposing regions of the light valve array that are each substantially larger in area than the pixels at the imaging zone to be imaged thereby and optical means for directing light from the larger pixel exposing regions of the array pixels respectively to the reduced-size pixels of the imaging zone. This improved approach can be implemented in various different advantageous configurations including modes wherein the pixel exposing regions of the array are arranged in (1) a single linear row across the image zone, (2) a plurality of linear rows which are staggered with respect to the direction of movement of a recording medium past the imaging zone and (3) a spaced relation across the exposure zone adapted for transverse indexing and multiple passes of a medium past the imaging zone. The present invention also encompasses other different preferred implementations of this approach for obtaining increased inter-pixel exposure uniformity in electronic light valve imaging.

BRIEF DESCRIPTION OF THE DRAWINGS

The subsequent description of preferred embodiments of the invention refers to the attached drawings in which:

FIG. 1 is a schematic perspective view of one preferred embodiment of the present invention;

FIG. 2 is a plan view of a portion of an exemplary electro-optic modulator suitable for use in the FIG. 1 apparatus; and FIGS. 3–6 are schematic diagrams showing alternative embodiments of the present invention.

DETAILED DESCRIPTION OF THE PREFERRED EMBODIMENTS

Referring to FIG. 1, the electronic color imaging apparatus 10 there illustrated comprises an illumination source 11 for uniformly illuminating light valve array 13, through collimating lens 12, with different light colors in a sequential fashion. U.S. Pat. application Ser. No. 230,098, entitled "Light Valve Imaging Apparatus Having Improved Optical Configuration", and filed Jan. 29, 1981, in the name of J. R. Varner discloses a preferred approach for collimating the array illuminating light to be substantially normal to the array ingress surface. The illumination source can include separately-energizable red (R), green (G) and blue (B) light sources as illustrated, comprise a panchromatic source and moving multicolor filter as disclosed in U.S. Pat. No. 4,229,095 or an electro-optic device such as disclosed in U.S. patent application Ser. No. 230,096, entitled "Electronic Color Imaging Apparatus Having Improved Color Control Device", filed Jan. 29, 1981, in the name of J. M. Mir.

The light valve array 13 comprises entrance and exit polarizers 14 and 15 which are crossed in direction of polarization and sandwiched therebetween. The electro-optic modulator 16 can be formed of a material such as disclosed in U.S. Pat. No. 4,229,095, which transforms from an isotropic, non-polar state to a birefringent polar state in response to application of an electric field, 9/65/35 PLZT being one specific preferred material.

As shown in more detail in FIG. 2, the modulator 16 has reference electrodes 21 and signal electrodes 22 formed on the surface thereof in a configuration adapted to provide discrete, separately-activatable electric fields transversely across the pixel portions $P_1-P_{10}$ of the electro-optic panel 20. In the embodiment illustrated in FIG. 2, the reference electrodes 21 are commonly coupled to a source of reference potential, e.g., ground and the signal electrodes of each pixel portion are separately addressable with a potential by addressing means, e.g. serial in-parallel out shift register 25 to activate their respective pixels to an ON or OFF condition. An exemplary addressing ("V" potential applied, "O" no potential applied) is shown in FIG. 2 for the pixel ON, OFF conditions indicated. There are a variety of electrode configurations which can be utilized to create discrete, separately-activatable fields transversely across the discrete pixel portions of a panel of electro-optic material, some of which are disclosed in copending U.S. patent application Ser. No. 230,099, entitled "Light Valve Imaging Apparatus Having Improved Addressing Electrode Structure", filed Jan. 29, 1981, in the names of J. M. Mir and J. R. Varner. Also, one preferred approach for activating voltage level(s) is disclosed in U.S. patent application Ser. No. 230,095, entitled "Light Valve Imaging with Optimized Addressing Potential(s) to Reduce Inter-Pixel Nonuniformity" and filed Jan. 29, 1981, in the name of J. M. Mir and a preferred addressing technique for continuous tone imaging is disclosed in U.S. patent application Ser. No. 230,092, entitled "Improved Light Valve Imaging Apparatus and Method for Providing Gray Scale", filed Jan. 29, 1981, in the name of J. M. Mir.

In general, the application of an activating field across the inter-electrode gaps "g" of a pixel exposing region of the electro-optic material causes it to transform to a birefringent state and rotate the direction of polarization of light passing therethrough. Thus the polarized light from entrance polarizing means 14 is rotated by activated pixel exposing regions and is not rotated by non-activated pixel exposing regions. Exit polarizing means 15 is crossed relative to entrance polarizing means 14 and therefore light passing activated pixel exposing regions of the modulator 16 passes exit polarizer while light passing non-activated modulator portions does not.

The movement of recording medium M through exposure zone 19 by transport 30, the energization of illumination source 11 by color control 31 and the activation of addressing means 25 by address control 32 are all synchronized, e.g. by synchronization control 33 so that the $P_1-P_{10}$ pixel portions of each line of the recording medium are exposed or not to the different colors of light in accordance with the color image information of the image to be reproduced that is carried to addressing control e.g. in the form of an electrical image signal. It will be appreciated that all multicolor information can be input during a single pass of the recording medium (in which case the illumination source would provide at least three separate color pulses per line) or that the medium can make multiple passes (e.g. once for each of red, green and blue exposures). Regardless of which of these or other addressing approaches is utilized, it is highly desirable that the different pixel portions of the recording medium receive the same exposure when the light valve is addressed to provide equal exposures thereto. It has been noted, however, that in prior art techniques complete uniformity of response is quite difficult to attain; and as a result, bands or streaks are sometimes visible on the recording medium as differences in density due to different exposures by differently modulating pixel exposing regions of the light valve arrays. This can be more fully appreciated if it is supposed that a light valve array is addressed to uniformly expose all portions of the medium M moving past the exposure station. Thus all pixel exposing regions of the array modulator would be addressed with the same activating voltage for each line. The result should be a completely uniform density; however, if the individual light valve pixel regions exhibit non-uniform response the bands respectively exposed by each (indicated by dotted lines in FIG. 1) will have a different density which is detractive, particularly in continuous tone areas of an image.

We have found that detractive artifacts of the type described above, which relate to modulating non-uniformities of such electro-optic light valve arrays can be reduced significantly by providing light valve pixel exposing regions of substantially larger area than the pixels to be exposed thereby at the exposure zone 19 and optical means for directing light from those regions respectively to corresponding, reduced-size pixels at the exposure zone. Various exemplary embodiments for implementing this approach will be described subsequently; however, first a description of the physical phenomena pertaining to such non-uniformities and to their amelioration, in accordance with the present invention, will be helpful.

The parameters which might have significant influence on the uniformity of modulation by a light valve array such as shown in FIGS. 1 and 2 include the gaps "g" between electrodes, the thickness "t" of the modulator, the electric field E induced by the voltage V applied to the signal electrode and the crystallographic and compositional variation of the electro-optic material forming the modulator.

Although certain of these parameters such as modulator thickness, electrode gap and applied voltages can be held within tolerances which minimize the non-uniformity caused thereby, the materials variations mentioned above remain as significant problems with respect to exposure uniformity. In this regard, it may be helpful to reiterate that the light modulating effect of the light valve construction (i.e. the electrode bearing modulator 16 and crossed polarizers 14 and 15) implemented by the modulator's shifting or non-shifting of the polarization direction of transmitted light. This modulating effect can be termed relative retardation $\Delta R$ and the physical parameters affecting such modulation are the birefringence $\Delta n$ and the optical path over which such birefringence is effective. The birefringence of such modulator is in turn dependent on the refractive index of the material "n", the applied field "E" and the electro-optic coefficient of the material "R" generally in the relation:

$$\Delta n = \tfrac{1}{2} n^3 \cdot R \cdot E^2.$$

It has been found that small variations in the electro-optic coefficient R, caused by e.g. crystallographic and compositional variation of the electro-optic material, can produce substantial non-uniformity of light transmission through activated light valve arrays. Aforementioned U.S. patent application Ser. No. 230,095, filed Jan. 29, 1981, entitled "Light Valve Imaging Apparatus with Optimized Addressing Potential(s) to Reduce Inter-Pixel Nonuniformity" describes this phenomenon in more detail and provides effective structural embodiments and modes for operating at predetermined activating voltage levels to minimize inter-pixel non-uniformities caused by variation in electro-optic coefficient. Although highly useful, this approach does not completely obviate inter-pixel non-uniformity due to crystallographic and composition variation of the electro-optic material.

Thus, referring to the equation above, it will be noted that birefringence is also dependent on the refractive index of the material and both field-induced and zero-field variations in the refractive index (due to crystallographic and compositional material variations) cause scattering of light by the modulator. Since optical scattering depolarizes the light, non-uniform scattering by the pixels is reflected in non-uniform transmission. Our experiments have indicated that non-uniform transmission due to scattering, and in addition non-uniformities of transmission due to other pixel variations such as electrode spacing, thickness variation and electro-optic coefficient variation can be significantly reduced by maximizing the operative area of the individual pixel exposing regions of an array in order to increase the number of crystallites whose individual effects are integrated.

The light valve 13 and cooperative optical means of FIG. 1 illustrate one embodiment for effecting this approach of enlarged sample integration. Thus, it will be noted in FIG. 1 that the individual pixel exposing regions $P_1$–$P_{10}$ of the light valve array are of larger operative area than the pixel portions of exposure zone 19 which they expose. Also, it can be seen that each of the array's pixel exposing regions $P_1$–$P_{10}$ has associated therewith an individual lenslet 37 which is adapted to direct light from its particular pixel exposing region to significantly smaller pixel areas located along the transverse exposure zone 19. In the preferred embodiment illustrated in FIG. 1, an apertured mask 38 is positioned between the array and the exposure zone to sharply define the optical path from each pixel exposing region of the array at its respective exposing location along the exposure zone. In applications involving light of a narrow bandwidth, e.g. monochrome exposing with a laser light, the mask structure would not be needed, but in other applications it is highly preferred.

One mode of operation for the FIG. 1 embodiment of the invention can now be described. As successive transverse lines of the photosensitive recording medium M are moved past the exposure zone 19 by drive 30, synchronizing control 33 regulates color control 31 and light valve address control 31 so that successive electrical signals, in accordance with the color information of the image to be reproduced, are applied to activate light valve pixel exposing regions $P_1$–$P_{10}$. When activated, each of the pixel exposing regions transmits light which is directed by lens means 37 to respective ones of the smaller exposure zone pixels $P_1'$–$P_{10}'$. It will be noted that in this embodiment the light valve's pixel exposing regions are arranged in two staggered rows and their cooperating lenslets are therefore constructed to direct the light beam from the pixel exposing regions up or down and to the right or left as appropriate to attain a line of contiguous exposure zone pixels $P_1'$–$P_{10}'$. It will now be appreciated that because the active areas of the light valve pixel exposing regions are larger than the exposure zone pixels that more crystallites can be integrated into modulating effect on each exposing light beam.

FIG. 3 discloses schematically another embodiment 40 for practice of the present invention. The FIG. 3 embodiment can be generally the same as that shown in FIG. 1 except that the light valve array configuration 41 and the cooperating optical means for directing light from the pixel exposing regions to the exposure zone is different. In this embodiment, the pixel exposing regions of the light valve array are constructed in a single linear row which extends transversely across and on both sides beyond the exposure zone. Thus, as the recording medium is moved through the exposure zone (located directly under the array in the FIG. 3 view), the individual pixel exposing regions $P_1$–$P_8$ are activated to expose reduced-sized pixel portions of the recording medium in accordance with the image information applied to the array addressing means. The relative locations to which the cooperating optical means for array 41 direct the light from pixel exposing regions $P_1$–$P_8$ are indicated in dotted lines at a downstream position (i.e. as if the recording medium had moved in the direction indicated by the distance "X".

FIG. 4A discloses another embodiment 50 and mode for practice of the present invention. This view is similar to FIG. 3 and the locations at which the various pixel exposing regions of the array 51 expose a line of the medium M are indicated at a downstream position in dotted lines. In this embodiment, the enlarged pixel exposing regions $P_1$–$P_8$ are in staggered rows similar to the FIG. 1 embodiment; however, in the FIG. 4A embodiment, cooperating optical means direct light controlled by the pixel exposing regions into two rows at the exposure station. Thus the light from pixel exposing regions $P_1$, $P_3$, $P_5$ and $P_7$ is directed to pixels of reduced-size and spaced intervals across a first row at the exposure zone and light from the pixel exposing regions $P_2$, $P_4$, $P_6$ and $P_8$ are imaged at reduced size and spaced at interleaving intervals across a downstream row of the exposure zone. As shown, address control 53 applies addressing signals directly to the $P_1$–$P_7$ row and to the $P_2$–$P_8$ row via one line delay means 54. FIG. 4B shows the intervening mask means 55 which is located between the light valve array and the record medium M.

FIG. 5 illustrates yet another embodiment of light valve imaging apparatus 60 in a view similar to FIGS. 3 and 4A. In this configuration the light valve array 61 comprises three staggered rows of pixel exposing regions. These pixel rows can be addressed with appropriate delays like FIG. 4A (with the cooperating optics directing light therefrom to interleaving, reduced-size positions); or the cooperating optical means can be constructed to direct light from the pixel exposing regions to reduced size pixels in a single line across the exposure zone.

FIG. 6 illustrates an embodiment 70 of the invention adapted for multiple passes of the recording medium past the exposure station. In this embodiment the light valve array 70 comprises a single row of enlarged pixel exposing regions designated $P_1/P_2$, $P_3/P_4$, $P_5/P_6$, $P_7/P_8$. The cooperating optical means are constructed to direct light from those regions to reduced size pixels at the exposure zone in a spaced relation. Thus in a first pass of the recording medium, the address control 75 outputs signals to the pixel exposing regions to control exposure for the $P_1$, $P_3$, $P_5$ and $P_7$ portions of each line of the recording medium. After the first pass, either the recording medium path or the array is indexed transversely one pixel width (to the dotted line position) and during the second pass the address control 75 outputs signals to expose the $P_2$, $P_4$, $P_6$ and $P_8$ portions of each line according to the image to be reproduced. It will be appreciated that reformat and store logic 76 can be provided if the format of the electrical image signal is not in a form directly accommodating this mode of imaging.

The invention has been described in detail with particular reference to certain preferred embodiments thereof, but it will be understood that variations and modifications can be effected within the spirit and scope of the invention.

What is claimed is:

1. In electronic imaging apparatus having an imaging zone and including: (1) a light valve array having a plurality of pixel exposing regions each discretely activatable between a light transmitting and light blocking condition in response to an addressing electric field, (2) means for directing uniform illumination toward said imaging zone via said light valve array, and (3) addressing means for selectively activating the pixel exposing regions of said light valve array in accordance with the content of an image to be reproduced, the improvement wherein the pixel exposing regions of said light valve array are each larger in area than the pixels to be imaged at said imaging zone and wherein said apparatus includes means for directing light from respective pixel exposing regions of said array to respective reduced-sized pixel areas in said imaging zone.

2. The invention defined in claim 1 wherein said light directing means is adapted to form a line of pixels across said exposure zone.

3. The invention defined in claim 1 wherein said pixel exposing regions are configured as a linear array having a length substantially greater than the width of said imaging zone.

4. The invention defined in claim 1 wherein said pixel exposing regions are configured in a plurality of linear rows, each extending across a substantial portion of said imaging zone.

5. The invention defined in claim 1 wherein said pixel exposing regions are configured in a plurality of linear rows, each extending across a substantial portion of said imaging zone and further including time delay means for delaying the image information addressed to at least one of said pixel rows.

6. The invention defined in claim 1 further including means for supporting a recording medium at said imaging zone and wherein said light directing means is adapted to direct light from said pixel exposing regions in spaced relation at said exposure zone and means for indexing one of said array and said recording medium transversely during recording of an image.

7. The invention defined in claim 1 wherein said light directing means includes mask means, located between said array and said imaging zone, for sharply defining each pixel exposing region at its respective pixel position in said exposure zone.

8. In electronic imaging apparatus having an exposure zone past which a photosensitive medium can be moved for imagewise exposure and including: (1) a light valve array having a plurality of pixel exposing regions each including a modulator portion which is independently addressable by an electric field from an isotropic to a birefringent state, (2) means for directing illumination toward said exposure zone via said light valve array, (3) means for moving successive line portions of such photosensitive medium past said exposure zone and (4) addressing means for activating the pixel exposing regions of said light valve array between light transmitting and non-transmitting conditions in synchronization with the movement of said medium and in accordance with the density pattern of an image to be reproduced, the improvement wherein the pixel exposing regions of said light valve array are each substantially larger in area than the pixels to be imaged at said exposure zone and wherein said apparatus includes optical means for directing light from said pixel exposing regions to respective pixels of a reduced size at said exposure zone.

9. The invention defined in claim 8 wherein said optical means is adapted to direct light from said array pixel exposing regions respectively to pixels in a single line across said exposure zone.

10. The invention defined in claim 8 wherein said pixel exposing regions are configured as a linear array having a length substantially greater than the width of said exposure zone.

11. The invention defined in claim 8 wherein said pixel exposing regions are configured in a plurality of linear rows, staggered in the direction of movement of said medium and each extending across a substantial portion of said exposure zone.

12. The invention defined in claim 8 wherein said pixel exposing regions are configured in a plurality of linear rows, staggered in the direction of movement of said medium and each extending across a substantial portion of said exposure zone and further including time delay means for delaying the image the information addressed to at least one of said rows for a period equal to at least one line advance of said medium through said exposure station.

13. The invention defined in claim 8 wherein said optical means is adapted to direct light from said pixel exposing regions in spaced relation at said exposure zone and further including means for indexing one of said array and said recording medium path transversely between multiple passes of said medium through said exposure zone.

14. The invention defined in claim 8 wherein said optical means includes mask means, located between said array and said exposure zone, for sharply defining each pixel exposing region at its respective pixel position in said exposure zone.

* * * * *